April 8, 1958 C. E. WEDDINGTON 2,829,779
SERVICE TRAY FOR AUTOMOBILE INSTRUMENT PANEL
Filed Oct. 15, 1954 2 Sheets-Sheet 1

INVENTOR.
CHARLES E. WEDDINGTON,
BY

McMorrow, Berman & Davidson
ATTORNEYS.

April 8, 1958 C. E. WEDDINGTON 2,829,779
SERVICE TRAY FOR AUTOMOBILE INSTRUMENT PANEL
Filed Oct. 15, 1954 2 Sheets-Sheet 2

INVENTOR.
CHARLES E. WEDDINGTON,
BY
McMorrow, Berman + Davidson
ATTORNEYS.

United States Patent Office 2,829,779
Patented Apr. 8, 1958

2,829,779

SERVICE TRAY FOR AUTOMOBILE INSTRUMENT PANEL

Charles E. Weddington, Crest Line, Calif.

Application October 15, 1954, Serial No. 462,527

5 Claims. (Cl. 211—88)

This invention relates to an improved service tray, especially but not exclusively for mounting upon an automobile instrument panel.

The primary object of this invention to provide a generally superior tray of this kind having means for securely holding thereon such articles as containers of liquid, cigarettes, matches or the like and which prevents spilling or scattering the articles regardless of the motion of the vehicle in which the tray is mounted.

Another object of this invention is to provide a structurally improved automobile instrument panel tray which is attractive in appearance, rugged in construction, and relatively simple in operation, and which may include a readily detachable auxiliary article supporting tray upon which food or other articles may be supported within easy and convenient reach of the driver and other occupants of the vehicle.

Other objects and advantages of the invention will become apparent from the following description, forming the specification, and taken in conjunction with the accompanying drawings, in which.

Figure 1:
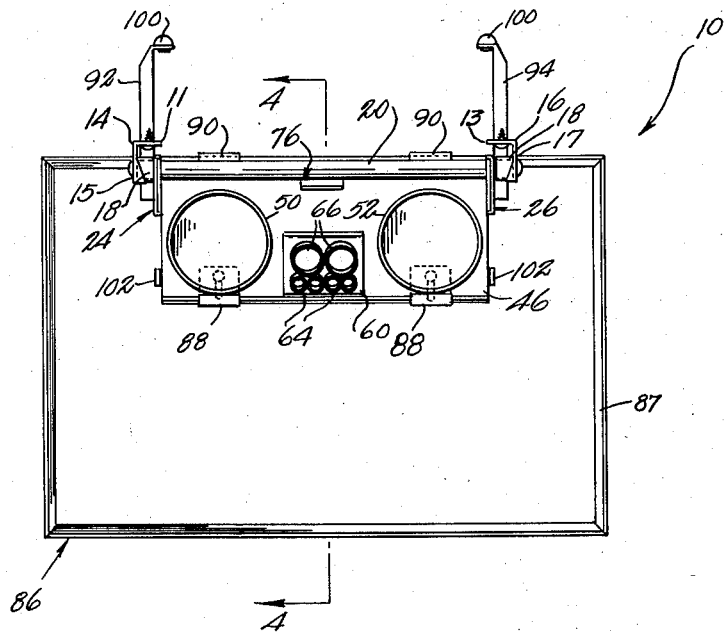
Figure 1 is a top plan view of a service tray embodying this invention.
Figure 2:
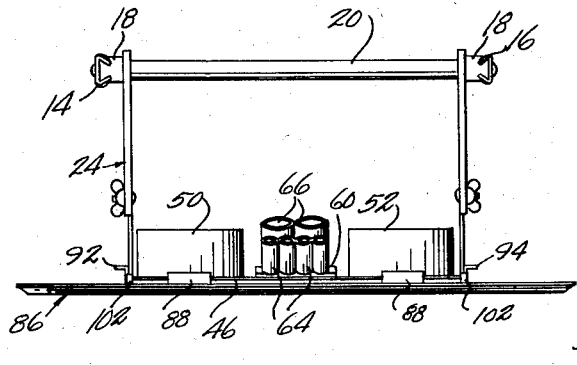
Figure 2 is a front elevational view thereof.
Figure 3:
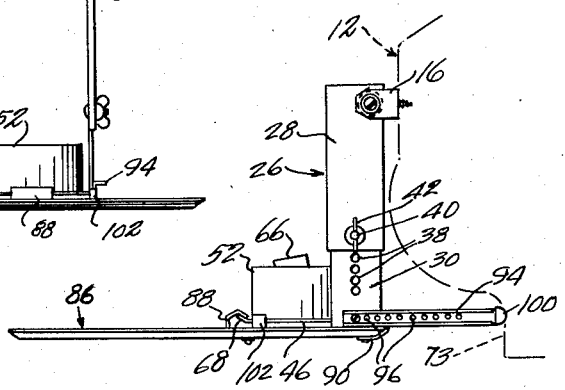
Figure 3 is a side elevational view.
Figure 4:
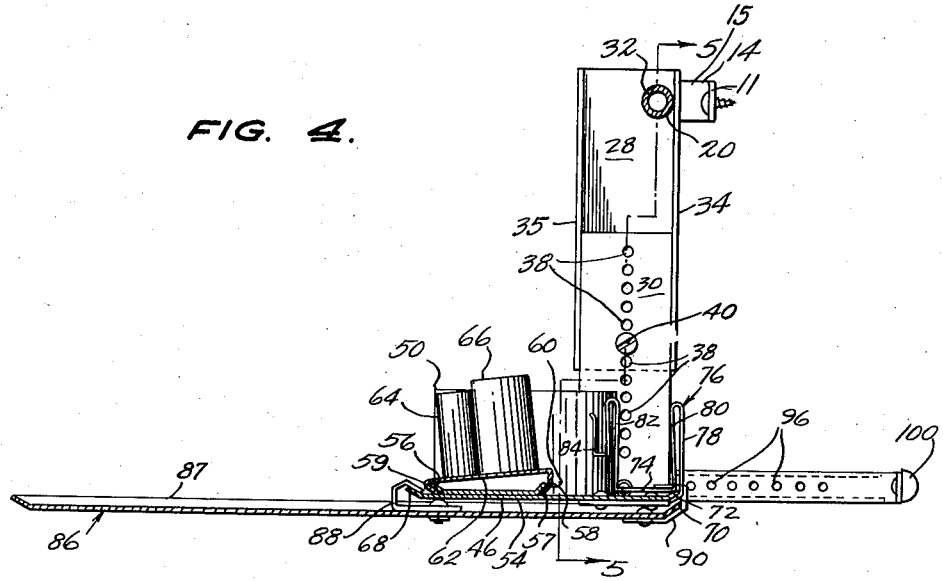
Figure 4 is an enlarged transverse vertical cross sectional view taken substantially on line 4—4 of Figure 1.
Figure 5:
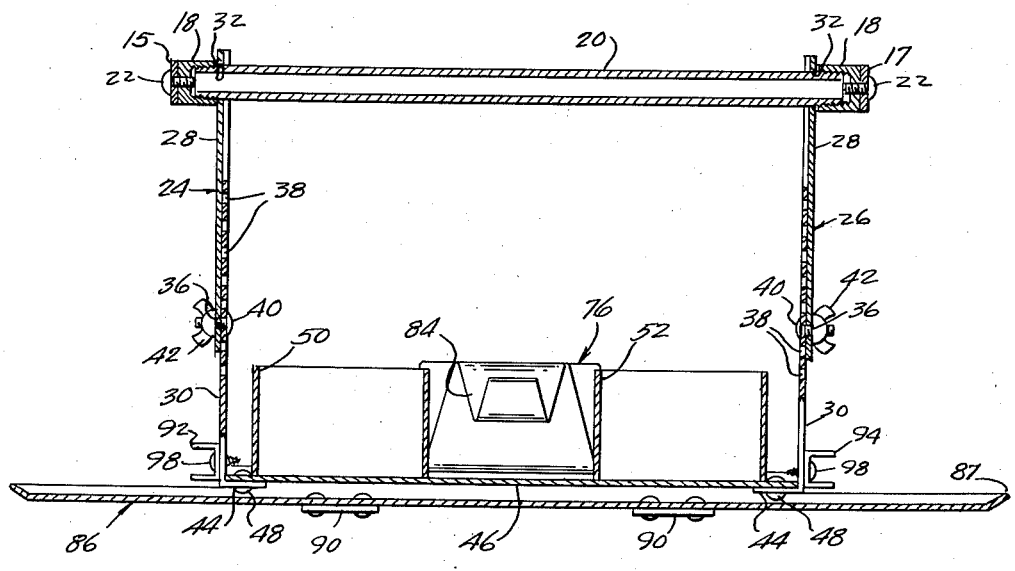
Figure 5 is a vertical longitudinal cross sectional view taken substantially along line 5—5 of Figure 4.

With continued reference to the drawings, the illustrated service tray, generally designated 10, particularly adapted for mounting on the instrument panel 12 of an automotive vehicle comprises a pair of laterally spaced reclining angle brackets 14 and 16 having legs 11 and 13, respectively, secured to the instrument panel 12 in horizontally aligned relation, with their legs 15 and 17 extending rearwardly from the panel 12.

Secured to the laterally inward sides of the bracket legs 15 and 17 are facing support rod receiving sockets 18. A cylindrical, preferably tubular, support rod 20 extends between the brackets 14 and 16 and has its opposite ends preferably threadably engaged in the sockets 18 and extends longitudinally of the instrument panel 12.

Metal screws 22 may be employed to secure the sockets 18 to the bracket legs 15 and 17.

A pair of laterally spaced vertical hanger arms, generally indicated at 24 and 26, are dependingly carried by the support rod 20 adjacent opposite ends thereof. Each of the hanger arms comprises an upper section 28 and a lower section 30. The hanger arm sections 28 are provided with openings 22 adjacent their upper ends and offset forwardly from their vertical center lines. The support rod 20 passes through the openings 32 in the upper sections 28 so that the hanger arms are swingable on the support rod.

The upper hanger arm sections 28 are of channel cross section and have laterally inwardly projecting vertical flanges 34 and 35, with upper ends of the lower sections 30 slidably engaged with the upper sections 28 between the flanges 34 and 35. Adjacent their lower ends the upper sections 28 are provided with openings 36 which are adapted to be registered with selected arms of vertically spaced openings 38 which are provided in the upper ends of the lower sections 30 to receive bolts 40, so that the length of the hanger arms 24 and 26 can be selectively adjusted. Wing nuts 42 on the bolts are provided to secure the hanger arm sections together.

The lower ends of the lower hanger arm sections 30 have laterally inwardly extending support flanges 44.

A generally rectangular tray base plate 46 extends between and extends rearwardly from the hanger arms 24 and 26 and rests upon and is secured adjacent its forward corners to support flanges 44 as by being riveted thereto, at at 48.

The base plate 46 has on its upper side a pair of cylindrical laterally spaced upstanding cups 50 and 52 located adjacent opposite side edges thereof.

Mounted upon the base plate 46 adjacent the rear longitudinal edge thereof between the article retaining cups 50 and 52, is a clip retainer plate 54 having upwardly and outwardly extending longitudinal flanges 56 and 57 along its forward and rear longitudinal edges for releasably retaining resilient hook flanges 58 and 59, respectively, of a clip plate 60 which has a flat central portion 62 between the flanges 58 and 59, which is preferably slightly forwardly inclined with respect to the surface of the base plate 46.

The flat portion 62 of the clip plate 60 carries thereon a plurality of upstanding, article-receiving cups 64 arranged in side by side relation along the rear longitudinal edge of the clip plate and a pair of larger, upstanding, article-receiving cups 66 in side by side relation forwardly of the row of cups 64. The cups 64 and 66 may be used as cigar and cigarette receptacles, and may also be used to receive ashes from cigars and cigarettes.

On its forward and rear longitudinal edges the base plate 46 has upwardly directed retaining flanges 68 and 70, respectively.

An inverted U-shaped one-piece cigarette package and match holder 76 is formed of a resilient sheet metal material and is provided with a clip 72 defined by the space between the base 74 of this holder, and a return leg 78 which is in spaced relation to the rear leg 80 of the holder, with the free end of the return leg being bent downwardly and inwardly toward the base 74 so that the clip 72 will be secured upon the clip retaining flange 70 at a mid-point location therealong and the base 74 extends in spaced parallel relation above the base plate 46. The holder 76 is also provided along its front leg 82 with an integrally formed, generally U-shaped book match holder 84 A pack of cigarettes may be inserted in the holder 76 between the front and rear legs 82 and 80 so as to be retained therein by the inherent resilience of the holder. The same is true also of the match holder 84.

A generally rectangular article supporting tray, generally designated 86, of considerably larger size than the article supporting base plate 46, has its peripheral edge turned upwardly and outwardly to define a guard rail 87 therearound. A pair of laterally spaced spring clips 88 are secured to the upper surface of the tray 86 to releasably engage over the rear retaining flange 68 of the base plate 46. A similar pair of laterally spaced spring clips 90 releasably engage over the front retaining flange 70 of the base plate 46, so that the article supporting tray 86 can be removably mounted on and under the base plate 46 with a considerable area of the tray 86 extending rearwardly beyond the base plate 46 and beyond opposite sides of the base plate, as clearly shown in Figure 1.

Thus, while the tray 86 is in place, a variety of articles can be supported thereon, such as plates with food thereon, silverware, napkins, or any other article desired.

A pair of channel prop arms 92 and 94 are provided with rows of longitudinally spaced openings 96, and bolts 98 pass through selected ones of the openings 96 and lower end portions of the lower hanger arm sections 30 and secure the prop arms to the outer sides of the sections 30, to project forwardly from the sections at selected distances.

The forward ends of the prop arms 92 and 94 are provided with resilient bumpers 100 to non-injuriously engage a lower recessed portion 73 of the instrument panel 12 and prop the tray 86 in a horizontal position.

It should be noted that the tray 86 has a pair of laterally spaced upstanding stop lugs 102 arranged to engage the opposite side edges of the base plate 46 when the tray 86 is secured on the base plate by the clips 88 and 90, and prevent lateral movement of the tray 86 relative to the base plate 46.

While there are shown and described the preferred embodiment of the invention, it is to be understood that the structure is susceptible to change and modification and is limited only by the scope of the appended claims.

What is claimed is:

1. In an instrument panel service tray, a pair of laterally spaced brackets adapted to be secured to an instrument panel and project rearwardly therefrom, a horizontal longitudinal rod extending between and secured at its ends to said brackets, a pair of laterally spaced vertical hanger arms having upper and lower ends, the upper ends of the hanger arms being journaled on said rod inwardly of said brackets, a horizontal base plate positioned between and secured to the lower ends of the hanger arms, said base plate having forward and rear longitudinal edges, and a horizontal tray longer and wider than said base plate, said tray having forward and rear longitudinal edges, said tray being positioned beneath said base plate with its forward edge substantially aligned with the forward edge of the base plate and with its rear edge spaced rearwardly from the rear edge of the base plate, and means mounting the tray on the base plate.

2. In an instrument panel service tray, a pair of laterally spaced brackets adapted to be secured to an instrument panel and project rearwardly therefrom, a horizontal longitudinal rod extending between and secured at its ends to said brackets, a pair of laterally spaced vertical hanger arms having upper and lower ends, the upper ends of the hanger arms being journaled on said rod inwardly of said brackets, a horizontal base plate positioned between and secured to the lower ends of the hanger arms, said base plate having forward and rear longitudinal edges, and a horizontal tray longer and wider than said base plate, said tray having forward and rear longitudinal edges, said tray being positioned beneath said base plate with its forward edge substantially aligned with the forward edge of the base plate and with its rear edge spaced rearwardly from the rear edge of the base plate, and means mounting the tray on the base plate, and horizontal prop arms mounted on and extending forwardly from the lower ends of the hanger arms, said prop arms having forward ends arranged to engage the instrument panel below said brackets.

3. In an instrument panel service tray, a pair of laterally spaced brackets adapted to be secured to an instrument panel and project rearwardly therefrom, a horizontal longitudinal rod extending between and secured at its ends to said brackets, a pair of laterally spaced vertical hanger arms having upper and lower ends, the upper ends of the hanger arms being journaled on said rod inwardly of said brackets, a horizontal base plate positioned between and secured to the lower ends of the hanger arms, said base plate having forward and rear longitudinal edges, and a horizontal tray longer and wider than said base plate, said tray having forward and rear longitudinal edges, said tray being positioned beneath said base plate with its forward edge substantially aligned with the forward edge of the base plate and with its rear edge spaced rearwardly from the rear edge of the base plate, and means mounting the tray on the base plate, and horizontal prop arms mounted on and extending forwardly from the lower ends of the hanger arms, said prop arms having forward ends arranged to engage the instrument panel below said brackets, said prop arms being horizontally elongated and being adjustable lengthwise forwardly and rearwardly relative to the hanger arms.

4. In an instrument panel service tray, a pair of laterally spaced brackets adapted to be secured to an instrument panel and project rearwardly therefrom, a horizontal longitudinal rod extending between and secured at its ends to said brackets, a pair of laterally spaced vertical hanger arms having upper and lower ends, the upper ends of the hanger arms being journaled on said rod inwardly of said brackets, a horizontal base plate positioned between and secured to the lower ends of the hanger arms, said base plate having forward and rear longitudinal edges, and a horizontal tray longer and wider than said base plate, said tray having forward and rear longitudinal edges, said tray being positioned beneath said base plate with its forward edge substantially aligned with the forward edge of the base plate and with its rear edge spaced rearwardly from the rear edge of the base plate, and means mounting the tray on the base plate, and horizontal prop arms mounted on and extending forwardly from the lower ends of the hanger arms, said prop arms having forward ends arranged to engage the instrument panel below said brackets, said prop arms being horizontally elongated and being adjustable lengthwise forwardly and rearwardly relative to the hanger arms, said hanger arms comprising vertically adjustable upper and lower sections, and means associated therewith for securing the sections together in vertically adjusted relation.

5. In an instrument panel service tray, a pair of laterally spaced brackets adapted to be secured to an instrument panel and project rearwardly therefrom, a horizontal longitudinal rod extending between and secured at its ends to said brackets, a pair of laterally spaced vertical hanger arms having upper and lower ends, the upper ends of the hanger arms being journaled on said rod inwardly of said brackets, a horizontal base plate positioned between and secured to the lower ends of the hanger arms, said base plate having forward and rear longitudinal edges, and a horizontal tray longer and wider than said base plate, said tray having forward and rear longitudinal edges, said tray being positioned beneath said base plate with its forward edge substantially aligned with the forward edge of the base plate and with its rear edge spaced rearwardly from the rear edge of the base plate, and means mounting the tray on the base plate, said mounting means comprising a forward spring clip on said tray releasably engaged over the forward edge of the base plate, and a rear spring clip on said tray releasably engaged over the rear edge of the base plate.

References Cited in the file of this patent

UNITED STATES PATENTS

| | | |
|---|---|---|
| 1,921,463 | Graham | Aug. 8, 1933 |
| 1,964,550 | Breiding et al. | June 26, 1934 |
| 2,002,328 | Mitchell | May 21, 1935 |
| 2,020,074 | McGinley | Nov. 5, 1935 |
| 2,080,865 | Lassiter | May 18, 1937 |
| 2,125,476 | Westrope et al. | Aug. 2, 1938 |
| 2,296,028 | Gribble | Sept. 15, 1942 |
| 2,546,459 | Lee | Mar. 27, 1951 |
| 2,554,685 | Denis | May 29, 1951 |
| 2,593,222 | Tracy | Apr. 15, 1952 |
| 2,687,336 | Smith | Aug. 24, 1954 |
| 2,689,156 | Kolander | Sept. 14, 1954 |